Jan. 26, 1943.  A. BRIECHLE ET AL  2,309,300
CAMERA
Original Filed March 22, 1939  5 Sheets—Sheet 1

INVENTORS
Ambrosius Briechle, Roy T. Hurley
BY  and George E. Merritt
F. Bascom Smith
ATTORNEY.

Jan. 26, 1943.  A. BRIECHLE ET AL  2,309,300
CAMERA
Original Filed March 22, 1939  5 Sheets—Sheet 2
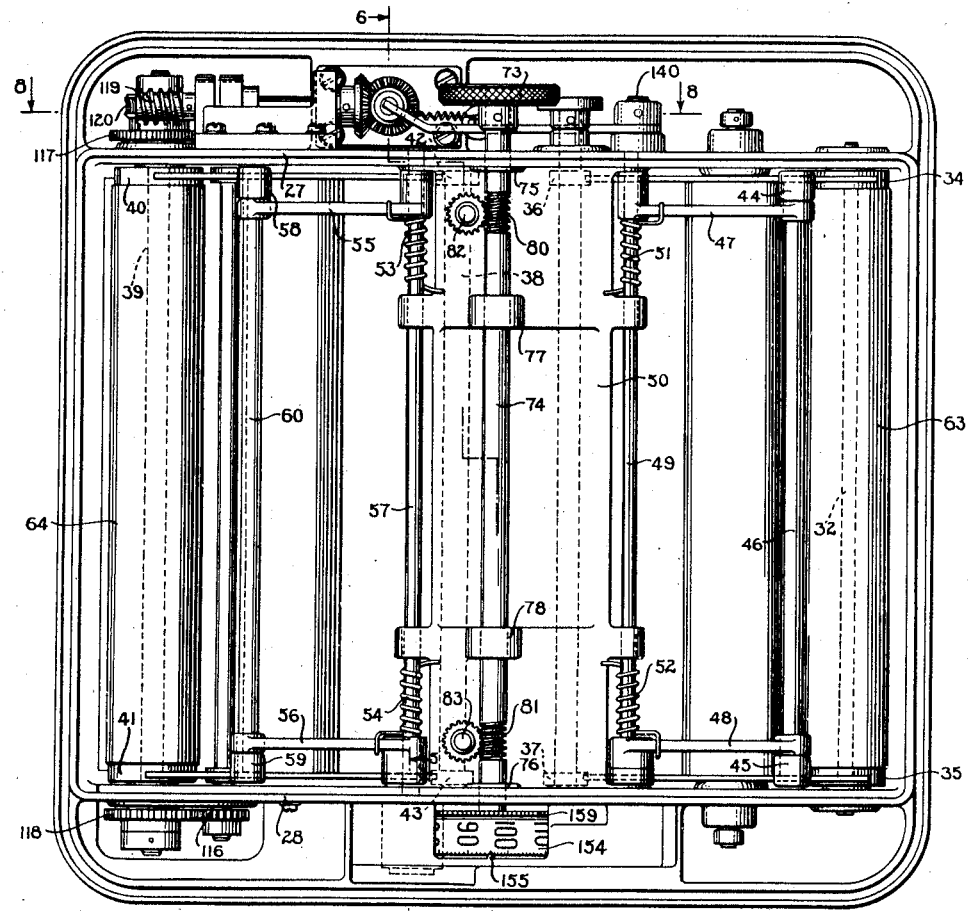
INVENTORS
Ambrosius Briechle, Roy T. Hurley
and George E. Merritt
BY
F. Bascom Smith
ATTORNEY.

Jan. 26, 1943. A. BRIECHLE ET AL 2,309,300
CAMERA
Original Filed March 22, 1939 5 Sheets-Sheet 3
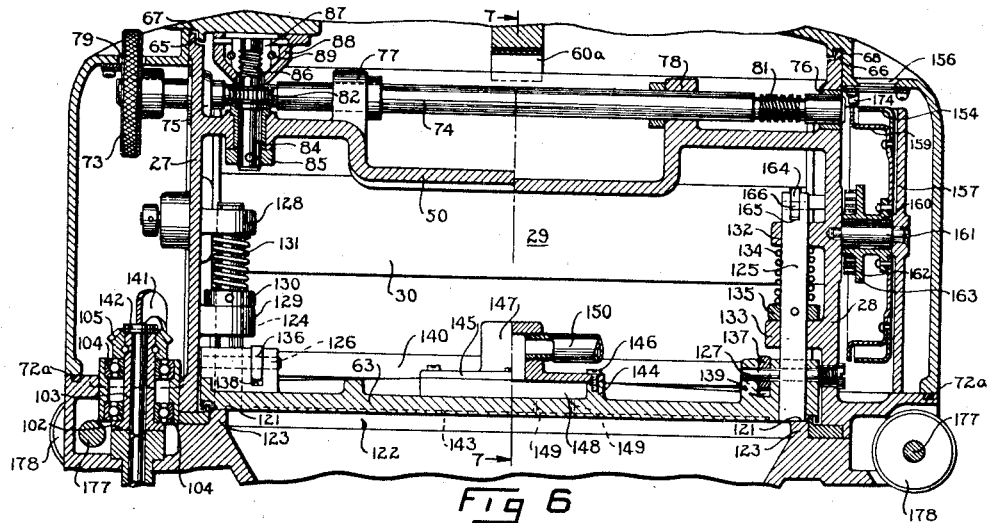
Fig 6
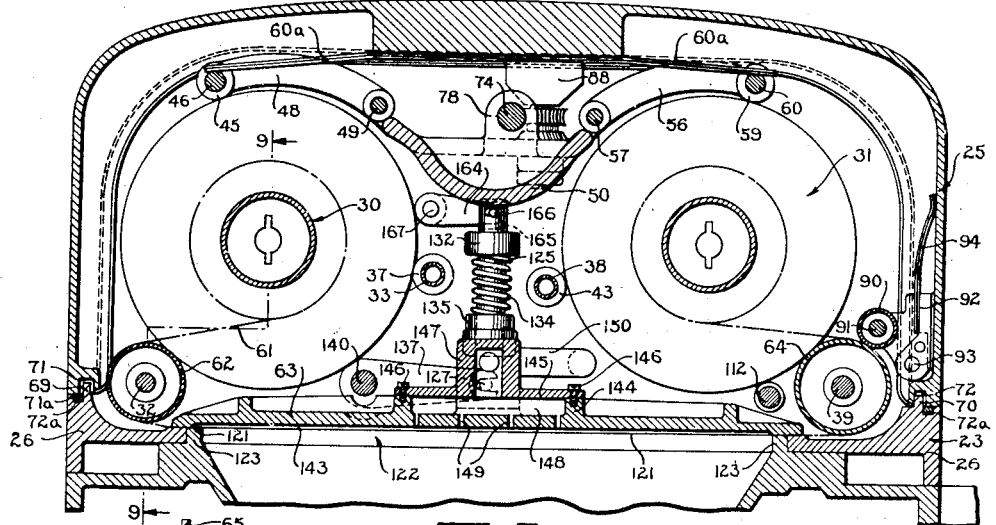
Fig 7
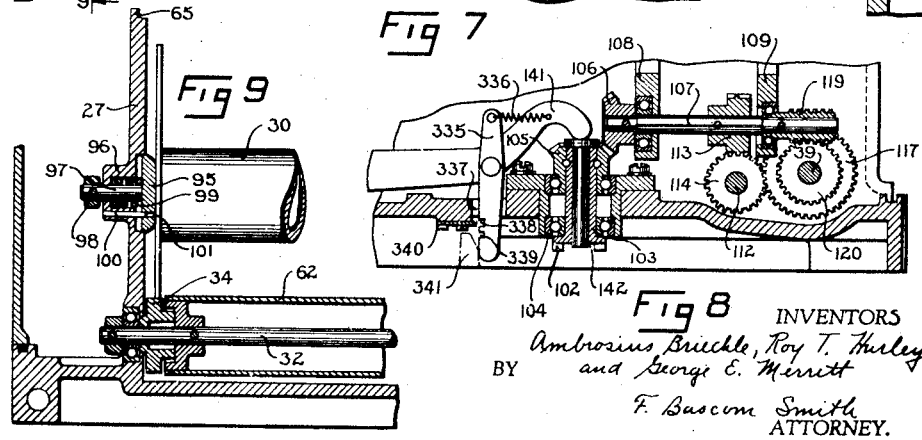
INVENTORS
Ambrosius Briechle, Roy T. Hurley
and George E. Merritt
BY
F. Bascom Smith
ATTORNEY.

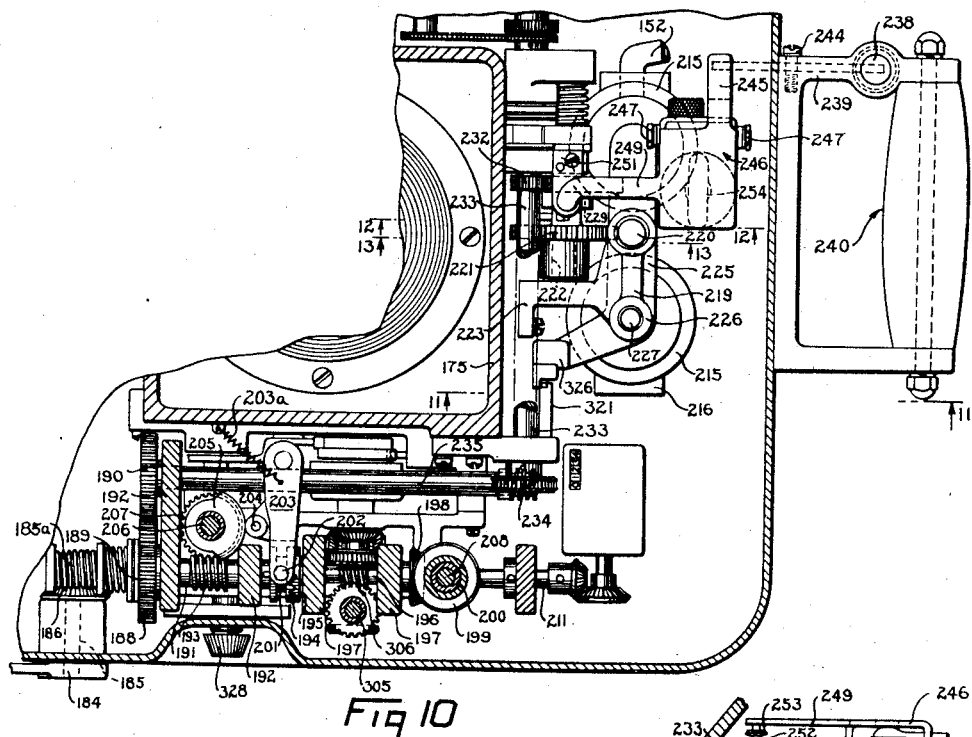

Jan. 26, 1943.  A. BRIECHLE ET AL  2,309,300
CAMERA
Original Filed March 22, 1939  5 Sheets-Sheet 5
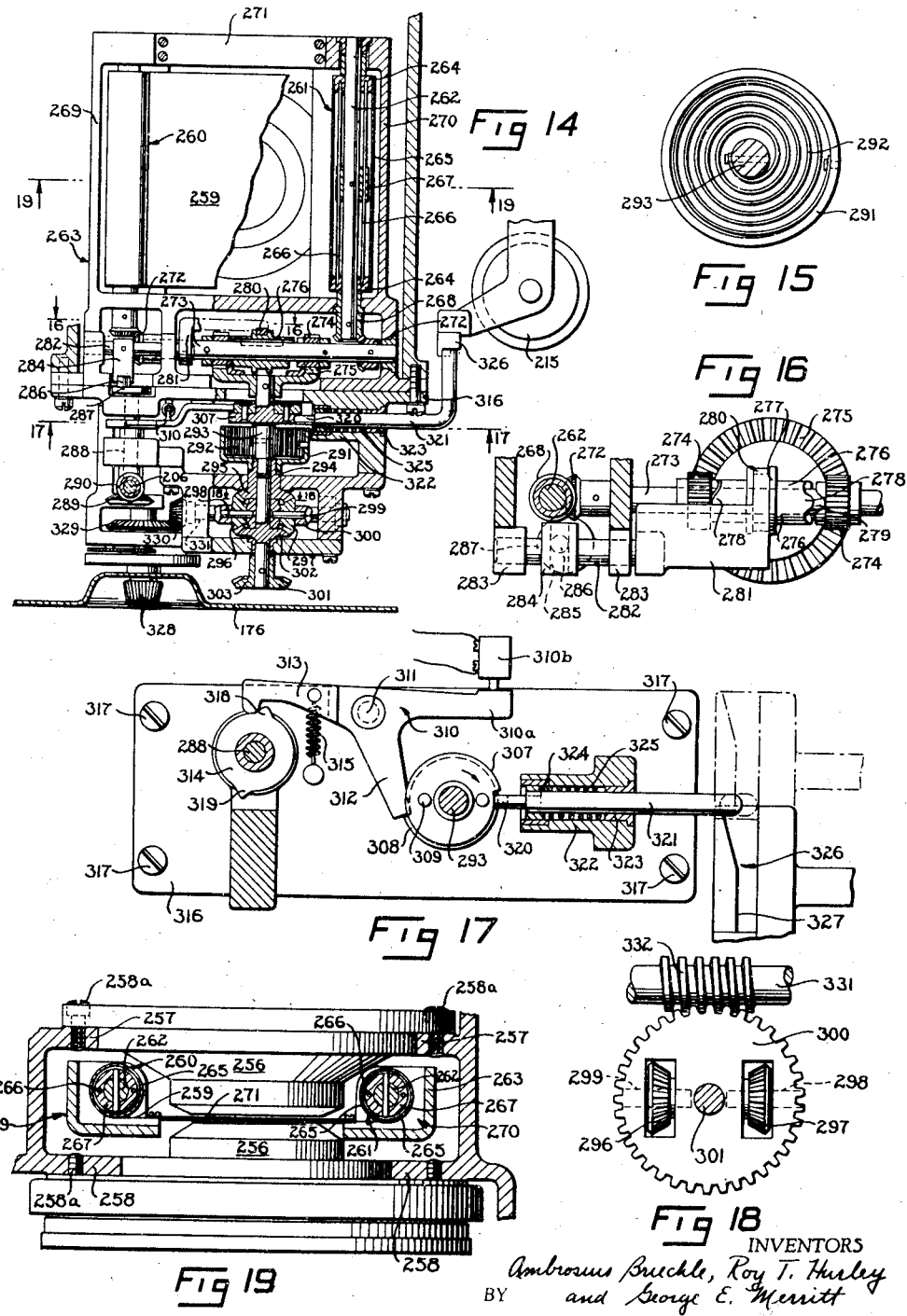
INVENTORS
Ambrosius Briechle, Roy T. Hurley
and George E. Merritt
BY F. Bascom Smith
ATTORNEY Patented Jan. 26, 1943

2,309,300

UNITED STATES PATENT OFFICE 2,309,300

CAMERA

Ambrosius Briechle, Brooklyn, Roy T. Hurley, Dobbs Ferry, N. Y., and George E. Merritt, Lusby, Md., assignors to Bendix Aviation Corporation, South Bend, Ind., a corporation of Delaware Original application March 22, 1939, Serial No. 197,402. Divided and this application October 23, 1939, Serial No. 300,730

18 Claims. (Cl. 95—57)

This invention relates to camera apparatus, and more particularly to shutter mechanisms and the control apparatus therefor.

This application is a division of the copending application Serial No. 197,402 filed March 22, 1939, for Bombing camera (now Patent No. 2,283,788).

An object of this invention is to provide a novel shutter mechanism having a curtain shutter adapted for operation in an aerial camera.

Another object is to provide a shutter mechanism having a novel curtain shutter.

A further object is to provide a novel mechanism adapted to control the energization and release of the shutter actuating power means.

Still another object of the invention is to provide a camera shutter comprising a novel curtain, said curtain being operable between the elements of the camera lens and having novel drive rolls whereby compensation for change in diameter of the curtain roller is made and whereby the curtain may be held taut.

Further objects include the provision of a novel driving means in combination with the curtain rolls of the shutter for driving the same, and means for controlling said drive to produce a variety of curtain speeds.

The above and further objects and novel features of the invention will more fully appear from the following description when the same is taken in connection with the accompanying drawings. It is to be expressly understood, however, that the drawings are for the purpose of illustration only and are not intended to define the limits of the invention, reference being primarily had for this latter purpose to the appended claims.

In the drawings, wherein like reference characters refer to like parts throughout the several views, Fig. 1 is a front elevation, with parts broken away and partly in section, of one embodiment of the present invention, showing a cone, a magazine and a cover in normal operative positions;

Fig. 3 is a detail top plan view of the magazine with the cover removed;

Fig. 4 is a rear elevation of the magazine with the cone and cover removed and with parts broken away to show the details of the counter structure;

Fig. 5 is a sectional view taken substantially on line 5—5 of Fig. 3 with the cone and cover in operating position and showing the fluid conduit connection from the cone to the magazine;

Fig. 6 is a sectional view taken substantially on line 6—6 of Fig. 3 with the cone and cover in operating position;

Fig. 7 is a similar view taken on line 7—7 of Fig. 6;

Fig. 8 is a sectional view taken substantially on line 8—8 of Fig. 3 and showing a means for locking the pressure plate against accidental or inadvertent movement after removal of the cone;

Fig. 9 is a sectional view taken substantially on line 9—9 of Fig. 7;

Fig. 10 is a top plan view, with parts broken away and partly in section, the section being taken substantially on line 10—10 of Fig. 1;

Fig. 11 is a detail sectional view, with parts broken away, taken substantially on line 11—11 of Fig. 10;

Fig. 12 is a sectional view taken substantially on line 12—12 of Fig. 10;

Fig. 13 is a similar view taken on line 13—13 of Fig. 10;

Fig. 14 is a sectional view, with parts broken away, taken substantially on line 14—14 of Fig. 1, showing, partly in plan and partly in section, the shutter mechanism and the control and drive therefor;

Fig. 15 is a somewhat enlarged rear elevation, partly in section, showing a form of spring drive utilized for motivating the shutter rolls;

Fig. 16 is a similar view taken substantially on line 16—16 of Fig. 14;

Fig. 17 is a somewhat enlarged sectional view, taken substantially on line 17—17 of Fig. 14, showing a form of cam means adaptable for releasing the shutter curtain;

Fig. 18 is a similar view taken substantially on line 18—18 of Fig. 14; and

Fig. 19 is a sectional view taken substantially on line 19—19 of Fig. 14, showing the relative positions of the shutter mechanism and the lenses.

Figures 1, 2:
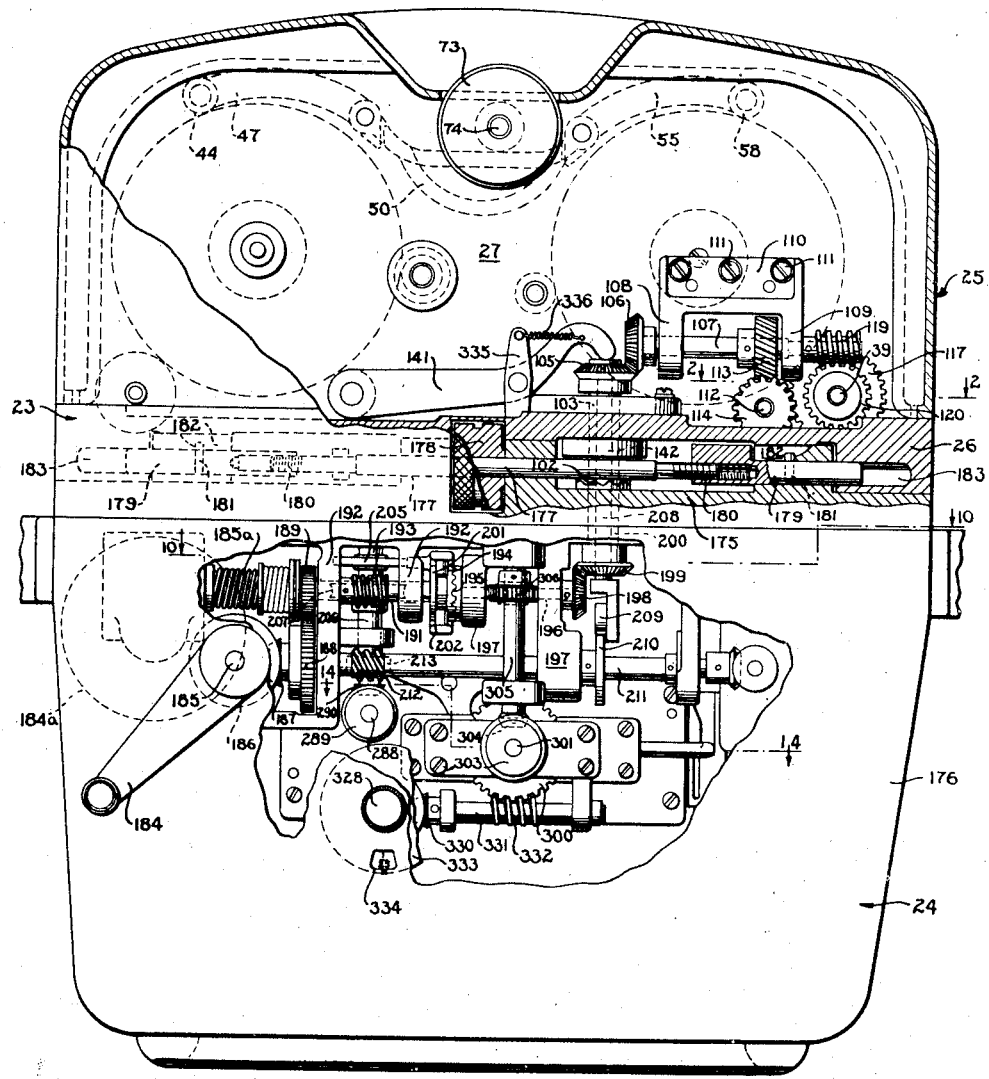
Fig. 2 is a sectional view of a part of the film roll drive taken substantially on line 2—2 of Fig. 1.

In the illustrated embodiment, the camera of the present invention is shown as having two major sections, i. e., a magazine 23 in which the film is housed, suitably positioned, and metered for exposure, and a cone 24 in which the driving and control mechanisms, the shutter and the lenses are mounted. A cover 25 is provided for the magazine serving to keep said magazine dust and light-proof and to cooperate with parts of the magazine and perform other useful functions, to appear later. It will be noted that the section housing the film and the section housing the lenses are, by the present construction, adjacent each other permitting means, hereinafter more fully described, to be utilized which may fix the film plane independently of the accuracy with which the cone is mounted on said magazine.

*Magazine and cover*

Magazine 23 comprises a main casting 26 having two longitudinally spaced, upwardly extending walls 27 and 28 (Figs. 1, 3 and 6), which walls, in combination with cover 25, form a central chamber 29, in said magazine. Two film rolls 30 and 31 (Fig. 7) are adapted for rotation about fixed longitudinal axes in said chamber, and the unexposed film, preferably wound upon roll 30, is adapted to be unwound therefrom and exposed by means to be hereinafter more fully described, and then rewound upon roll 31. Rolls 30 and 31 are alike and of the standard type construction well-known to the art, having two end pieces of circular shape in the form of discs and a central cylinder of a lesser diameter than said end pieces upon which the film is wound.

Heretofore, film rolls for aerial cameras have been fixed for rotation in the magazines of said cameras by trunnions located at the centers of rotation. However, in the present device, in order to facilitate camera loading, this method of central support has been eliminated and novel means are provided whereby the film rolls are positioned for rotation about fixed longitudinal axes by merely inserting the rolls into the magazine chamber in the general direction of the final position which said rolls will assume. The novel means consist of a three-point support for each of the film-roll end pieces, two of said supports in each instance serving to determine the film roll position and the third applying the pressure to fix the end pieces of the rolls in position for rotation with the supports.

As shown in Figs. 3 and 7, the supports determining the position of roll 30 are mounted on two shafts 32 and 33 which are journalled for rotation in walls 27 and 28 and which extend longitudinally therebetween. Mounted on the ends of the shaft 32 adjacent the internal faces of the walls 27 and 28, respectively, are supporting rolls 34 and 35 on which the end pieces of film roll 30 are adapted to rotate. Similarly mounted for the same purpose on shaft 33 are rolls 36 and 37 and a similar construction comprising shafts 38 and 39 and supporting rolls 40, 41, 42 and 43 is provided for mounting film roll 31.

Placing the end pieces of each film roll on the supports hereinbefore described determines the longitudinal axes of rotation for the film rolls. However, to fix the film roll end pieces so that they will remain in contact and rotate with the supporting rolls, a third support adapted to be resiliently held against the end piece is provided. Rolls 44 and 45 (Figs. 3 and 7), secured to a shaft 46 for rotation therewith, function to hold film roll 30 as the third supports therefor, and are resiliently urged by means of a pair of arms 47 and 48 into engagement with the end pieces of said film roll. Arms 47 and 48 support shaft 46 and are pivotally mounted on a second shaft 49 which, in turn, is journalled in suitable bearings in an upper central portion 50 of the magazine casting. Portion 50 may be cast integrally with the main casting of the magazine or may be suitably affixed to said casting between walls 27 and 28. In order to resiliently urge rolls 44 and 45 into engagement with the end pieces, a pair of light coil springs 51 and 52 are wound about shaft 49. Each of said springs has one end thereof bearing upon one of the arms 47 or 48 and the other end thereof bearing upon portion 50 and each tends to expand and urge the arm with which it cooperates into engagement with film roll 30. The force exerted upon said roll due to said springs is only sufficient to prevent said roll from falling out of said magazine when the same is inverted with cover 25 removed, as, for example, when the film is being threaded into position. A structure which is the duplicate of the above described means for holding roll 30 in operative position is also provided for holding roll 31 and comprises coil springs 53 and 54, arms 55 and 56 pivotal about a shaft 57 and rolls 58 and 59 mounted upon a shaft 60. Other resilient means, in the form of a leaf spring 60a, are also provided in cover 25 being suitably secured thereto to have the spring ends bear against the central portions of shafts 46 and 60 and thereby yieldingly urge the supporting rolls mounted on said shafts into engagement with the film rolls.

After inserting film rolls 30 and 31 into the magazine by merely raising shafts 60 and 46 (the cover being removed), and dropping said film rolls in position, the loading of the camera is effected by threading the film 61 (shown by a broken line in Fig. 7), from roll 30, over an idler roll 62, fixed to shaft 32 (Fig. 9), then under a pressure plate 63, and thence over a metering drum 64 to film roll 31, said metering drum being secured to and rotatable with shaft 39. The film is fixed to roll 31 by any suitable method, as, for example, by insertion of the end of the film into a slot arranged therefor in the cylinder of said roll.

After the film has been loaded into the magazine in the manner above described, cover 25 is placed thereon. The walls 27 and 28 (Fig. 6) have flanges 65 and 66, respectively, extending the length of the upper edges thereof and said flanges are adapted to fit into grooves 67 and 68, respectively, provided therefor in cover 25 and to thereby form a light trap keeping light from entering chamber 29. Similar light traps between the lower edge of said cover and magazine casting 26, comprising flanges 69 and 70 (Fig. 7) in said magazine and grooves 71 and 72 in said cover, complete the means whereby chamber 29 is kept light-proof. To keep the magazine interior dust-proof, an additional groove 71a is provided in main casting 26 along the edge thereof completely circumscribing the magazine interior and having a strip or washer 72a of some yielding substance such as rubber or felt fixed therein. The bottom of the cover when the latter is correctly positioned on the magazine fits over said strip and compresses the same, thereby producing a dust-proof joint or connection between said magazine and cone.

Novel means are provided for locking cover 25 to magazine 23 by merely placing said cover over said magazine and then exerting a slight downward pressure thereon. After the cover has been thus fixed in position, release of said locking means can only be effected by rotation of a thumb screw 73 (Figs. 1 and 3) thus insuring against accidental or inadvertent removal of the cover during operation of the camera. As shown, said locking means comprises a shaft 74 mounted for rotation in bearings 75 and 76 located in walls 27 and 28, respectively, and in upwardly extending lugs 77 and 78 (Figs. 6 and 7) cast integrally with or rigidly fixed to portion 50 of the magazine casting. Shaft 74 has a part thereof projecting outside of wall 28 and has thumb screw 73 mounted on this projecting portion. A slot or opening 79 is provided in cover 25 in order that thumb screw 73 may extend through said slot and be operable from the exterior of said cover.

A pair of worms 80 and 81, preferably integral with shaft 74, are rotated thereby and are adapted to engage and rotate worm gears 82 and 83, respectively. Gear 82 is suitably secured to or integral with a vertical shaft 84 and the lower end of the latter extends through portion 50 and is held against axial movement by means of a collar 85 affixed thereto. A portion 86 of said shaft also extends upwardly above gear 82 and is suitably threaded so that a split nut 87 secured to cover 25 may engage the same. Said nut is split into two segments, each of which is pivotally mounted in a casting 88 fixed to cover 25 and a coil spring 89 is wound about said segments to keep the same together and normally operative as a single nut. However, threaded portion 86 of shaft 84 may be made to engage the split nut without being screwed into said nut by having the latter forced down upon it, thereby prying apart the segments of said nut against the constricting force of coil spring 89 and permitting said threaded portion to be grasped by said nut. Thumb screw 73 may be rotated thereafter to further increase the threaded engagement between nut 87 and portion 86, threading the latter into the former through the worm and gear 80, 82. A split nut means similar to that described above is provided for cooperating with worm and gear 81, 83, so that rotation of shaft 74 by thumb screw 73 also controls the locking and releasing of said unit. Both units are unlocked for removal of the cover by rotation of shaft 74, said shaft operating the worm and gear drives of the threaded shafts and causing rotation of said threaded shafts in a direction to unscrew the same from the split nuts.

In order to expose a new frame of film after each photograph is taken, metering drum 64 is rotated through a predetermined angular distance after each exposure and novel means are provided for maintaining the film in contact with said drum during rotation thereof so that the film may be accurately metered thereby. The novel means comprise a pressure roll 90 (Fig. 7) suitably mounted on a shaft 91 which is journalled at each end in a bracket 92, pivotally mounted by means of a pin 93 on the inner wall of cover 25. Resilient means, such as a leaf spring 94, are secured to said bracket, and when the cover is locked to the magazine, said resilient means urge pressure roll 90 against metering drum 64 pressing the film into frictional engagement with said drum. By mounting the pressure roll on the cover, the necessity for threading the film between rolls during loading is eliminated and the process of loading is accomplished more readily and more quickly than heretofore in cameras which had the pressure roll and the metering roll mounted in the magazine in fixed relation to each other.

Movement of the film by means of metering drum 64 rotates idler roll 62 and unwinds the film from film roll 30, causing the latter to rotate in a clockwise direction as viewed in Fig. 7. In order to frictionally resist the free rotation of said film roll and keep the film under a slight tension so as to minimize the possibility of wrinkling, means, such as a friction disc 95 (Fig. 9), are provided in the magazine for applying a frictional force which tends to retard the rotation of film roll 30. A hollow boss 96 is cast integrally with wall 27 of the magazine and friction disc 95 is mounted on a rod 97 which extends through said boss and has a collar 98 secured to the outer end thereof. Disc 95 is held in frictional engagement with the end piece of roll 30 by the expansive force of coil spring 99 interposed between said disc and the bottom of said boss and surrounding rod 97 within said boss. A pin 100, mounted in wall 27 and extending into an opening 101 in disc 95, holds said disc against rotary movement. A similar disc (not shown) is preferably provided in wall 28 directly opposite disc 95 for the other end piece of film roll 30. As a result, a pull must be exerted upon the film which is sufficient to overcome the resistance of the friction discs. The latter, in addition to keeping the film taut, serve to center the film roll between the walls 27 and 28, this being one reason why a pair of discs is provided.

The film after passing from metering drum 64 is wound on roll 31, the latter being frictionally driven by supporting rolls 40 and 41 (Figs. 2 and 3) on which the end pieces of said film roll rest. The end pieces are adapted to slip on said supporting rolls while being driven thereby because the speed at which said supporting rolls tend to drive the film is in excess of the speed at which said film roll must rotate to take up all the film passing from the metering drum. As a result, the film is kept taut between said drum and said film roll while being wound upon the latter.

Means located in the cone, to be hereinafter more fully described, are provided for driving the mechanism which imparts rotary motion to the metering drum 64 for moving the film and to the two supporting rolls 40 and 41 for driving film roll 31. Said mechanism comprises an upper member of a jaw coupling 102 (Figs. 1 and 8) integral with or suitably fixed to a hollow shaft 103, said shaft being journalled for rotation in a set of ball bearings 104. A bevel gear 105 secured to the upper end of shaft 103 meshes with a bevel gear 106 affixed to a shaft 107 and is adapted to drive the latter which is journalled for rotation in suitable bearings mounted in a pair of downwardly extending arms 108, 109 of a bracket 110. The latter is secured by screws 111 to the outside face of wall 27 of the magazine casting.

To actuate supporting rolls 40 and 41, a shaft 112 is drivably connected to shaft 107 by means of a pair of engaging helical gears 113 and 114, the former being fixed to shaft 107 and the latter to the end of shaft 112. The latter extends through and is journalled for rotation in walls 27 and 28 and has secured thereto a pair of spur gears 115 and 116 (Fig. 3), gear 115 (Fig. 2) being mounted adjacent the outside face of wall 27 and meshing with spur gear 117. The latter is keyed to the hub of supporting roll 40, which bears on but rotates freely of shaft 39, and drives said roll. Spur gear 116 (Fig. 3) is similarly mounted adjacent the outside face of wall 28 and meshes with gear 118, to drive supporting roll 41 at the same speed and in the same manner as roll 40 is driven. Accordingly, film roll 31 is driven at both ends by supporting rolls 40 and 41 and applies a uniform force across the width of the film during the winding thereof.

Metering drum 64 is rotated by a worm 119 (Figs. 1 and 8) fixed to shaft 107 and a worm wheel 120 fixed to shaft 39, the latter shaft having said drum secured thereto for rotation therewith. The worm drive rotates drum 64 at a slower speed than the helical drive through which supporting rolls 40 and 41 are driven, producing the tension in the portion of film between said metering roll and the film roll.

In order to provide exact and clear photographs, a high degree of accuracy in fixing the film plane, so that it coincides with the focal plane, is necessary. Novel means, mounted in the magazine and adapted to cooperate with cone 24, are provided for locating the film plane, said means comprising pressure plate 63 (Fig. 7) and an accurately finished, plane surface 121 which fixes the position of the film and the pressure plate plane with relation to the lenses. Surface 121 which is a part of the cone casting is accurately finished in a plane and the lenses are subsequently adjusted to have the focal plane thereof coincide with said plane. Pressure plate 63 is preferably a metal casting, substantially rectangular in shape, having its lower face finished and grooved and being of sufficient size to cover an opening 122 in the upper end of the cone casting. The film is urged into contact with the base of said pressure plate by means to be described hereafter, and the sensitive side of said film is exposed in the direction of opening 122 so that a photographic impression may be made thereon when the shutter is released. Surface 121 is the top surface of a flange 123 integral with the upper end of the cone casting, said flange defining opening 122.

Normally, pressure plate 63 is yieldingly urged into contact with finished surface 121 of the cone casting by means comprising a pair of vertical arms or rods 124 and 125 (Fig. 6), mounted in recesses provided therefor in said pressure plate and held in said recesses by pins 126 and 127, respectively. A pair of inwardly extending lugs 128 and 129 cast integrally with wall 27 are provided having openings suitably bored therein in which rod 124 is slidably mounted and which guide said rod in any vertical movement thereof. A collar 130 is fixed to rod 124 between lugs 128 and 129 and a compressed coil spring 131 is mounted between said collar and upper lug 128, surrounding said rod and exerting an expansive force upon collar 130 which tends to move plate 63 in a downward direction into contact with cone surface 121. A similar structure to that above described, comprising lugs 132 and 133, coil spring 134 and collar 135, is provided in combination with rod 125 and exerts a downward force, augmenting the force of spring 131 upon the pressure plate. Rods 124 and 125 are loosely mounted in the openings provided therefor in the guiding lugs, an appreciable clearance existing between said openings and said rods in order that the base plane of the pressure plate may be aligned by the plane of finished surface 121 when brought in contact therewith even though the magazine is slightly askew in relation to the cone. As a result, pressure plate 63 is normally yieldingly held in the plane of finished surface 121, i. e., the focal plane of the camera lenses, and positions the film accordingly.

In order to expose a new frame of film after a photograph has been taken, the force normally exerted upon the film by pressure plate 63 must be overcome so that metering roll 64 may move the film. Accordingly, means are provided whereby pressure plate 63 is raised against the force of springs 131 and 134, relieving the pressure upon the film and permitting free movement thereof, said means, as shown, comprising a pair of arms or levers 136 and 137 which extend into slots 138 and 139, respectively. Slot 138 is adjacent to rod 124, being suitably positioned in the pressure plate casting to have pin 126 extend therethrough and to have said pin engaged by the pronged end of arm 136 (Fig. 7). Arm 137 similarly engages pin 127 and is, together with arm 136, secured to a shaft 140 for rotation therewith. Shaft 140 is journalled in walls 27 and 28 and has a portion thereof extending outside of wall 27, to which a lever 141 is affixed (Figs. 1, 3, 6, and 8). Lever 141 is adapted to rotate shaft 140 by transmitting thereto the reciprocal motion of a rod 142 (Fig. 8) so that whenever rod 142 is raised, lever 141 rotates in a counter-clockwise direction and likewise moves arms 136 and 137, thereby lifting pressure plate 63 sufficiently to clear the path of the film travel.

Rod 142 which reciprocates and actuates the above described mechanism for raising pressure plate 63 is mounted concentrically with shaft 103 in the hollowed center thereof. The reciprocal movement is imparted to said rod by cam means, to be hereinafter more fully described, said means being suitably timed to move rod 142 in an upward direction raising pressure plate 63 once after each exposure and keeping said pressure plate in a raised position during the interval in which the exposed frame of film is displaced by an unexposed frame. When said unexposed film frame has been suitably positioned between said pressure plate and surface 121 of the cone, the former is lowered into engagement with the latter and frictionally holds the film in the focal plane.

In order to eliminate any wrinkles or creases existent in the film after the same has been moved by metering roll 64 into position under pressure plate 63, novel means are provided whereby the film is urged by fluid pressure, against the base plane of said pressure plate, and is thereby smoothed out before being lowered into the fixed plane of cone surface 121. As a further precaution against wrinkling and creasing, and also to definitely fix the film in the focal plane, the same novel means are used a second time and urge the film into contact with the pressure plate when the shutter mechanism releases the shutter curtain to expose the film.

The novel fluid pressure means comprise a series of longitudinal and lateral channels or grooves 143 machined or cast in the base plane of pressure plate 63 in such a manner that when a plane surface of any nature is brought into contact with the base plane of said pressure plate, said grooves constitute a group of fluid conduits each of which is connected to every other. An annular flange 144 (Figs. 6 and 7) preferably located at the center of pressure plate 63, is cast integrally with the upper surface of said pressure plate and has a cap or cover plate 145 secured thereto by means such as screws 146. Cap 145 is preferably formed with a raised central portion 147 and together with flange 144 constitutes a fluid chamber 148 which is connected by a number of openings or passages 149 to grooves 143. A flexible conduit 150 is suitably positioned to communicate with chamber 148 and, as shown, is threadedly secured at one end to upper portion 147 of cap 145 and at the other end to a part of the magazine casting (Fig. 5). A passage 151 in said casting is adapted to connect flexible conduit 150 to a second flexible conduit 152 when the cone and magazine are operatively assembled. A suitable washer 151a is interposed between conduit 152 and the end of a tube 151b which forms the lower portion of passage 151. The suction passage is broken at the washer when the magazine is removed from the cone.

Means to be hereinafter more fully described, are provided in cone 24 for controlling the fluid pressure in flexible conduit 152 and, when cone and magazine are assembled, said means through passage 151 and conduit 150 are operatively connected to fluid chamber 148 and, therefore, adapted to regulate the pressure therein. By decreasing the pressure in said chamber to subatmospheric pressure, a suction is created in grooves 143 whereby the film, even though loosely stretched across the base of pressure plate 63 is forced into contact with said base. In this manner, the film is fixed in the plane of the base of said pressure plate and when the latter is in lowered position and supported by finished surface 121, said base plane in which the film is fixed is coincident with the focal plane. Said pressure means also operate to fix the film in the focal plane immediately prior to the release of the shutter mechanism. It will be understood that the above described results may be produced by utilizing suitable pressure means to create a pressure above atmospheric in the camera cone and by opening grooves 143 to the atmospheric pressure in the magazine, thereby producing a pressure differential tending to force the film into contact with the pressure plate.

In order to indicate the number of exposures made upon the film, a counter (Figs. 3, 4, and 6) is provided in the magazine and is adapted to register each exposure by the movement of calibrated drum 154 past stationary index mark 155, said drum and mark being visible through a window 156 (Fig. 6) conveniently positioned in the cover. A casing 157 surrounds drum 154 exposing only the portion visible through window 156 and as shown is attached to wall 28 by a screw 158. A ratchet wheel 159 (Figs. 3 and 4) is integral with or suitably fixed to drum 154 and is provided with a hub member 160, the unit being rotatably mounted on a shaft 161 fixed between casing 157 and magazine wall 28. A coil spring 162 having one end thereof secured to a flange 163 on hub member 160 and the other end fixed to wall 28, normally opposes rotary movement of ratchet wheel 159 and always tends to return drum 154, after rotation of the same, to zero position.

Since the pressure plate and, therefore, rods 124 and 125, are raised once for every exposure, every upward movement of said rod 125 is utilized in the present invention to motivate the means for rotating ratchet wheel 159 and drum 154 to indicate another exposure. Said means comprise a lever 164 (Fig. 4) having a bifurcated end which fits into a slot 165 provided therefor in arm 125, and which engages a pin 166 fixed to said arm and extending through said slot. The other end of lever 164 is secured to a shaft 167 which is journalled in and extends through wall 28 and which has a second lever 168 fastened thereto on the other side of said wall. Levers 164 and 168 and shaft 167 rotates as a unit and, therefore, when arm 125 moves upward, lever 168, on the opposite side of the fulcrum moves downward. A pawl 169, pivotally mounted on the end of lever 168 and resiliently urged by a spring 170 in the direction of ratchet wheel 159, engages said wheel when said lever is moved downward and rotates the former a predetermined number of notches, thereby rotating drum 154 a single graduation past index mark 155. When lever 168 is moved upward, moving pawl 169 therewith, a pin 171, fixed to wall 28 and extending perpendicularly therefrom, is adapted to engage pawl 169 and cause the same to disengage from ratchet wheel 159.

Novel means, rendered operable by pressing cover 25 into locked position with magazine 23, are provided for holding ratchet wheel 159 against rotation by spring 162, in a direction to return indicating drum 154 to a zero reading. Said means comprise a cantilever spring 172 fixed to casing 157 and having a curved end extending downwardly in the direction of ratchet wheel 159, said end being adapted to hold said wheel, as viewed in Fig. 4, against rotation in a counter-clockwise direction, when moved into engagement therewith. A member 173 slidably mounted in casing 157 is supported by spring 172 and when cover 25 is removed extends beyond the upper surface of said casing. However, when said cover is replaced, a part thereof, in the form of lug 174 (Fig. 6) bears against and moves member 173 downward, thereby moving spring 172 into engagement with ratchet wheel 159. As a result, whenever cover 25 is removed from magazine 23, indicating drum 154 is returned to zero position by the action of spring 162, so that indicating drum 154 usually registers the number of exposures made from the time the cover has been positioned on the magazine.

After a film roll has been fully exposed or perhaps during exposure thereof, an occasion for removal of the magazine from the cone may arise. A novel safety latch is provided in combination with pressure plate actuating lever 141 for holding the pressure plate in lowered position against the magazine casting, thereby preventing admittance of light into the magazine. The novel latch comprises a lever 335 (Figs. 1 and 8) pivotally mounted intermediate the ends thereof to lever 141 in a substantially vertical position. The upper end of lever 335 is resiliently urged, by a spring 336 fixed between said end and lever 141, to move in a clockwise direction. The lower end of lever 335 extends through an opening 337 in the magazine base and is provided with a pair of notches or openings 338 and 339, the former being positioned above the latter, and being adapted to engage a plate 340 suitably affixed to the base of the magazine and projecting beyond opening 337. With the cone removed, pressure plate 63 is in lowered position and spring 336 urges lever 335 in a direction to have plate 340 engage notch 338 and hold the pressure plate in the lowered position against any accidental or inadvertent raising thereof. When the cone is fixed to the magazine, a lug 341 shown in broken lines in Fig. 8 engages the lower end of lever 335 and moves said lever and the notches therein away from plate 340, and out of engagement with said plate, thereby leaving actuating lever 141 unaffected during the cyclic operations.

It is often desirable, as, for example, when threading the film from roll 30 to roll 31, to have pressure plate 63 held in raised position, and for this purpose, notch 339 is provided in lever 335. After removal of the magazine, lever 335 may be manually operated and raised so that notch 339, instead of notch 338, engages plate 340, thereby holding actuating lever 141 and pressure plate 63 in raised position.

Cone

Cone 24 comprises a central casting 175 substantially square in horizontal cross-section and preferably having each side thereof similar in contour to the shape of the side shown in section in Fig. 11. A casing 176, affixed to said casting and surrounding the same, encloses the driving and control mechanisms, to be hereinafter more fully described, which are mounted on said casting. Locking means are provided for securing magazine 23 to said cone and, as shown in Fig. 1, said locking means comprise a shaft 177 mounted for rotation in casting 175 and adapted to be rotated by a thumb screw 178 mounted on and secured to said shaft intermediate the bearings therefor and readily accessible from the outside of casing 176. Rotation of shaft 177 by thumb screw 178 causes axial movement of members 179 into which ends 180 of said shaft are threaded, said members being slidably mounted in casting 175 and constrained to axial movement by pins 181 fixed therein and radially extending therefrom, into longitudinal grooves 182 in said casting. The longitudinal displacement of members 179 caused by rotation of thumb screw 178 moves said members into or out of openings 183 provided therefor in magazine 23 and locks or unlocks cone 24 into or from operative position upon said magazine. In the embodiment illustrated, a second lock, of like construction to the above, is provided in the cone, and engages the opposite side of magazine 23.

The camera is operable either by manual or motor means and is shown as having a readily accessible hand crank 184 and a motor 184a, either of which may be utilized for actuating the driving and control mechanisms of the camera. Crank 184 is mounted on a shaft 185 and directly rotates, when turned, a bevel gear 186 which is formed with or secured to said shaft (Figs. 1 and 10). Bevel gear 186 meshes with a second bevel gear 187 and thereby drives, through spur gear 188, the latter two gears being mounted on the same shaft, two gears 189 and 190, which mesh with said spur gear. Motor 184a is connected by spring coupling 185a to gear 189, said coupling being of the type adapted to transmit a torque in only one direction, i. e., making a driving connection from the motor to the gear only.

Gear 189 is integral with or suitably keyed to a shaft 191, said shaft being mounted for rotation in downwardly extending brackets 192 and having a worm 193 and a jaw clutch plate 194 mounted thereon. Clutch plate 194 is adapted to operatively engage a corresponding plate 195 affixed to a second shaft 196 and to drive said second shaft when so engaged. Shaft 196 extends through and is journalled in brackets 197 and has a bevel gear 198 mounted thereon which meshes with a second bevel gear 199, the latter being secured to a hollow shaft 200, and thereby being adapted to drive the lower member of jaw coupling 102 which is also secured to said hollow shaft. Jaw coupling 102 has the upper and lower portions thereof operatively engaged and directly connecting shafts 200 and 103 when the cone is locked to the magazine.

As hereinbefore described, shaft 103, when driven through coupling 102, actuates the mechanism which meters the film and said film is metered during only a predetermined portion of the time necessary for the performance of the complete cycle of operations required to take each exposure. Accordingly, means are provided for automatically engaging and disengaging jaw clutch plates 194 and 195 at predetermined points of the operating cycle, thus controlling the operating period of the mechanism, including shaft 103 and metering drum 64 which is driven from clutch plate 195. In order to be disengaged from clutch plate 195, plate 194 is slidably keyed to shaft 191 and has a collar 201 integral therewith, said collar being adapted to cooperate with a yoke 202. Yoke 202 is formed integrally with a pivotal arm or lever 203 on which a roller follower 204 (Fig. 10) is mounted, the latter being actuated by a cam 205 and being urged into contact with said cam by a coil spring 203a fixed at one end to cone casting 175 and at the other end to arm 203. Rotation of said cam oscillates arm 203 and thereby actuates collar 201 and controls the engagement of clutch 194, 195.

Cam 205 is mounted on a shaft 206 which is driven through a worm and worm wheel drive, comprising worm 193 and a worm wheel 207, from shaft 191 and, therefore, is continuously rotating during the cycle of operations. The gears are preferably designed so that cam 205 moves a single revolution during each cycle of operations and said cam is designed to keep clutch 194, 195 engaged during approximately a half of said cycle, the film being accurately metered by drum 64 during said half cycle.

For the purpose of raising pressure plate 63 once during each cycle of operations, to free the film for metering in accordance with the above described method, means are provided for actuating rod 142 (Fig. 8) which, as hereinbefore described, operates the mechanism for raising and lowering said pressure plate. A rod 208 (Fig. 1) is slidably mounted in and extends through hollow shaft 200 and, when jaw clutch 102 is drivingly engaged, said rod is adapted to move upward and have its upper end bear against the lower end of rod 142, lifting the latter rod and raising pressure plate 63 through arm 141. The reciprocal movement is imparted to rod 208 through a cam mechanism comprising a roller cam follower 209 and a cam 210, the former being pivotally fixed to the portion of said rod extending beneath bevel gear 199 and the latter being mounted on a shaft 211, which is driven through a helical gear 212 mounted thereon and meshing with a second helical gear 213 secured to shaft 206. Shaft 211 is thus driven from crank 184 or motor 184a and rotates continuously during the cycle of operations and preferably moves a single revolution causing cam 210 to raise and lower pressure plate 63 once during each cycle.

In order to produce the suction which fixes the film in the best plane of pressure plate 63, pressure means comprising a plurality of bellows are provided, said bellows being adapted to expand rapidly from a collapsed position and thus have the pressures therein materially decreased. In the illustrated embodiment, two bellows 215, 215 (Fig. 10) are shown as being supported on a member 216 carried on casting 175, said member having an opening 217 (Fig. 11) therethrough which connects each of said bellows to conduit 152 and, therefore, to chamber 148. Thus, a suction, if created in said bellows, will also exist in said chamber and in grooves 143, urging the film into contact with pressure plate 63.

Bellows 215 are collapsed by suitable means against the resisting force of coil springs 218 located within said bellows and, when said collapsing means are released, said springs tend to return to normal position, thereby rapidly expanding the bellows. The collapsing means comprise a plate or bar 219 which extends over and rests upon the tops of said bellows and may be fixed thereto, and a rod 220 fixed to said bar intermediate the ends thereof. Rod 220 has gear teeth formed thereon and constitutes a rack which meshes with a pinion 221 freely mounted for rotation on a shaft 222, said shaft being journalled in and extending between brackets 223 and 224 secured to cone casting 175. A lug 225 is formed integrally with bracket 223 and has an opening therein in which rod 220 is mounted and which guides said rod during reciprocal motion thereof. Another lug 226 provided with an opening therein is also formed integrally with bracket 223 and serves as a guide for a rod 227 fixed to plate 219 and extending upwardly therefrom parallel to rod 220, said lugs and said rods keeping plate 219 horizontal during the collapsing and expansion of bellows 215.

When pinion 221 rotates in a clockwise direction, as viewed in Fig. 13, rack or rod 220 is moved downward, said downward motion being transmitted by plate 219 to bellows 215, collapsing said bellows against the resistive force of springs 218. This rotation of pinion 221 is accomplished by a pawl 228 (Fig. 12) pivotally mounted to a gear 299 and rotatable therewith, said pawl engaging notches in a hub 230 of said pinion and being held in engaged position with said notches by a plate spring 231 fixed to said gear. Plate spring 231 applies a counter-clockwise torque to pawl 228 which, when overcome, causes said pawl to pivot in a clockwise direction and release hub 230, thereby releasing pinion 221 for free rotation about shaft 222.

Gear 229 is mounted on shaft 222 and is driven by a gear 232 fixed to a shaft 233, the latter gear being adapted for continuous rotation during the operating cycle and accordingly continuously driving gear 229 in a clockwise direction. Shaft 233 is driven by a worm and worm wheel 234 from a shaft 235 which, in turn, is driven through gear 190, thereby constituting a drive from motor 184a.

For reasons hereinbefore stated, a suction is to be created on the pressure plate side of the film when said pressure plate is about to be lowered and again at the moment when the photograph is taken, thus requiring that bellows 215 expand twice during a single operating cycle. Accordingly, means are provided whereby pinion 221 is automatically released from gear 229 when pressure plate 63 is about to be lowered, causing bellows 215, which up to that part of the cycle are being collapsed, to expand and create the desired suction. For this purpose, a bracket 236 (Fig. 12) suitably fixed to casting 175 has an arm 237 extending vertically upward therefrom, said arm being adapted to engage a lug 238 which is integral with pawl 228 and to apply a clockwise torque to said pawl by engaging said lug. Application of said torque to said pawl causes the same to be released from hub 230 and thereby permits bellows 215 to expand and move the film into contact with pressure plate 63. The release of said pawl from said hub is preferably timed, by suitable choice of gearing and suitable positioning of arm 237, to occur substantially at the moment when pressure plate 63 reaches the focal plane determined by surface 121.

As gear 229 continues to rotate, pawl 228 moves past arm 237 and again operatively engages hub 230, thereby collapsing bellows 215 for a second time. When the bellows are fully collapsed, gear 229 has rotated a single revolution during the cycle and assumes a position corresponding to the initial position held thereby. In order to create a suction and simultaneously expose the film, novel means, to be described, are provided whereby the release of the bellows also controls the operation of the shutter mechanism. The shutter curtain, however, is moved for an exposure only by the second cyclic expansion of the bellows, the control mechanism being unresponsive to the first expansion.

Release of the bellows for the second cyclic expansion is accomplished either manually or automatically by means shown in Figs. 10 and 11. The manual means comprise a push button 238 slidably mounted in a supporting arm 239 of a handle 240, said arm being fixed to or integral with casting 175. A coil spring 241, interposed between push button 238 and arm 239, acts normally to project the upper portion of said button beyond the surface of said arm, and said button has the lower end thereof adapted to actuate one end of a lever 242. Lever 242 is fulcrumed for pivotal movement about a horizontal axis in a groove 243 in arm 239, by means of a screw or pin 244 mounted in said arm. The other end of lever 242 extends through casing 176 into cone 24 and is adapted to engage an arm 245 of a pivotal member 246, said member being mounted for rotation about an axis perpendicular to the pivotal axis of lever 242, and being held in position on said axis by nuts 247. Member 246 consists of a flat plate having two arms 245 and 249 integral therewith and disposed on opposite sides of the axis of rotation. Arm 249 extends parallel to said axis and engages a pin 250 slidably mounted in a support 251 fixed to bracket 224, said pin being yieldingly held against downward movement by suitable means such as a spring 252 positioned between said support and a bracket 253 secured to said pin. Support 251 is so mounted relative to gear 229 (Fig. 12) that pin 250 is directly over pawl 228 when the latter has caused bellows 215 to be collapsed for a second time, said pin being adapted to move said pawl clockwise when moved downward.

To disengage pawl 228 from hub 230 and expand bellows 215, push button 238 is depressed against the resistance of coil spring 241 to actuate lever 242, thereby raising arm 245 of member 246 and lowering arm 249 by overcoming the resistance of spring 252. As arm 249 and therefore pin 250 are moved downward, the latter moves pawl 228, releasing pinion 221 and permitting springs 218 to expand bellows 215, thus creating a suction in the grooves 143 of pressure plate 63 and thereby causing the film to adhere to the base plane of said pressure plate.

A solenoid 254, shown in the illustrated embodiment as positioned beneath pivotal member 246, is adapted, when energized, to attract said member and thereby operate the pawl releasing mechanism above described. The solenoid is utilized to effect an automatic control of the releasing mechanism by being connected to a source of electrical energy through a switch controlled, for example, by an interval meter (not shown).

*Shutter mechanism and lens*

A wide angle lens is supported by members 256 which are in turn supported and accurately aligned on flanges 257 and 258 provided therefor in cone casting 175, said members being secured to said flanges by means such as screws 258a. It will be noted that the cone casting carries the lens members and also provides the surface for determining the plane of the film, thus minimizing the possibility of misalignment between the lens and the film plane when the former is positioned during assembly.

The image of the object to be photographed is focused on the film by said lenses and impressed thereon when said film is exposed to the light by movement of a novel shutter curtain 259. Curtain 259, which is mounted in a lovel manner so as to be operative between the lenses, is adapted to be moved at various speeds to admit a predetermined amount of light through the lenses despite varying atmospheric conditions. Because of the rapidity with which the curtain must move in order to correctly control the passage of light, sudden forces of varying magnitudes are being intermittently applied in different directions to said curtain. In the present invention, in order to reduce or entirely eliminate the possibilities of some form of deformation in curtain 259 due to said forces, a novel curtain is provided. The latter is preferably composed of a suitable flexible metal such as beryllium copper, although a thin, finely meshed, metal screen which is impregnated with rubber or other opaque material may be successfully utilized.

Novel curtain drums or rolls 260 and 261 are provided for novelly mounting and driving curtain 259, and each comprises (Figs. 14 and 19) a central shaft 262 journalled for rotation in a substantially square frame or support 263. A pair of collars 264, 264, loosely mounted on central shaft 262, are secured to a hollow cylindrical drum 265 concentric with the axis of said shaft. Drum 265, to which curtain 259 is fixed and about which it is wound, is driven through a yielding drive comprising a plurality of wires 266, two being shown in the illustrated embodiment, which are slidably fixed at the ends in collars 264 and rigidly fixed at the centers in a collar 267. The latter collar is pinned to shaft 262 and rotatable therewith when said shaft is driven through bevel gear 268 mounted thereon. As a result of the above described structure, drum 265 is driven through said wires and is permitted a limited degree of rotation relative to shaft 262, depending upon the resiliency of wires 266 and the manner in which said wires are held in collars 264.

Both of the curtain rolls are similarly constructed and curtain 259 is suitably wound on said rolls and is adapted to be moved from one roll to the other exposing a new frame of film each time it is moved. Since drums 265 are exactly alike in construction and dimensions, the effective diameter of one roll decreases as that of the other increases when the curtain unwinds from the former to the latter during an exposure, due to the increasing number of curtain thicknesses upon the latter. If, under these circumstances, drums 265 are driven at the same angular velocity, a difference in linear velocities would arise at the drum peripheries tending to wind the curtain at a more rapid rate than it is being unwound and therefore causing an excessive tension or elongation to be produced in said curtain. Accordingly, the yielding drives are provided for the drums whereby, although the central shafts are driven at equal speeds, the drums are permitted relative rotation thereto, sufficient to compensate for the increasing and decreasing diameters resulting from differences in the number of curtain layers wound on the drums. As a further result of the novel drive construction, it is possible to constantly keep curtain 259 taut since said curtain may readily be mounted on drums 265 under an initial tension. Furthermore, the initial sudden load imparted to the shaft when an exposure is to be made is absorbed in part by the resiliency of the drive, causing a more uniform application of the force to the curtain.

It is highly desirable that the lens elements, once accurately fixed in position, remain undisturbed thereafter, and therefore frame 263 is suitably constructed and curtain 259 and rolls 260 and 261 are suitably mounted thereon, to have the shutter mechanism adapted for ready removal from operative position as a unit without affecting the lens. As shown, frame 263 comprises a U-shaped casting having the two parallel arms 269 and 270 thereof supporting rolls 260 and 261, respectively, and said arms and rolls are fitted into operative position by inserting frame 263 into cone casting 175 with the open end of the U-shaped casting foremost. Curtain 259 fits between the lens and a thin plate 271 may be secured across the open end of said casting in the horizontal plane of said curtain, thus adding to the rigidity of the structure and not detracting from its removability, since said plate, when frame 263 is inserted or removed, passes freely between the lens elements along with curtain 259.

Curtain rolls 260 and 261 are adapted to be driven by means which automatically alternate the direction in which said drums are rotated after each exposure causing the curtain to be alternately wound and unwound from each roll and to expose a film frame each time it is moved across the lenses. As illustrated in Figs. 14 and 16, said curtain rolls are driven through bevel gears 268 mounted on central shafts 262 of said rolls and said gears mesh with a pair of bevel gears 272 secured to a shaft 273. Shaft 273 is in turn adapted to be driven through either of two gears 274, 274 loosely journalled thereon and driven in opposite directions by an annular gear 275. A sleeve 276 slidably keyed between gears 274 to shaft 273 for rotation with said shaft has a collar 277 integral therewith and is provided with axially extending lugs or pawls 278 on each end thereof. The hubs of gears 274 extend beyond the faces of said gears in the direction of sleeve 276 and have suitable openings 279 therein adapted to be engaged by lugs 278. When sleeve 276 is moved in the direction of one of gears 274, that gear is engaged by those of lugs 278 on the adjacent end of said sleeve and a driving connection in the nature of a jaw coupling from annular gear 275 to curtain rolls 260 and 261 is established.

When an exposure is taken, gear 275 is driven at a predetermined high velocity, by means to be described, and moves curtain 259 and the opening therein past the lenses by means of the connection above described. If this movement of the curtain is, for example, to the right, as viewed in Fig. 14, then said curtain is wound upon drum 261 and for the next exposure must be unwound therefrom and moved in the opposite direction. Accordingly, during the interval between exposures while the new frame of film is prepared for exposure, sleeve 276 is automatically moved into engagement with the other of gears 274, thereby reversing the drive to the curtain rolls so that when gear 275 is next driven for an exposure, the curtain moves to the left, i. e., from the roll 261 to roll 260.

The means for moving sleeve 276 and thereby reversing the curtain roll drive are best shown in Fig. 16 and comprise a yoke 280 which cooperates with collar 277, said yoke being integral with a plate or arm 281. The latter is, in turn, secured to or formed with a shaft 282 slidably mounted for reciprocal movement in supports or brackets 283 which are an integral part of frame 263. A member 284 mounted on and suitably pinned to shaft 282 between supports 283 is provided with a groove 285 in the base thereof which extends in a direction perpendicular to the axis of said shaft. A pin 286 eccentrically mounted on or formed with rotary disc or plate 287 cooperates with said groove and is adapted to translate the rotary motion of said disc into reciprocal movement of member 284, thereby actuating sleeve 276. It will be understood that any other suitable linkage, such as a crank and connecting rod, could be employed to impart reciprocal movement to member 284 or to sleeve 276 directly. In the illustrated embodiment of the invention, disc 287 preferably rotates a half revolution during each operating cycle, moving sleeve 276 from one extreme position to the other during the single cycle, i. e., out of engagement with one of gears 274 and into engagement with the other. Disc 287 is preferably integral with a shaft 288 driven by a bevel gear 289 which meshes with a second bevel gear 290. The latter gear is secured to shaft 206 (Figs. 1 and 14) which also drives the cams that control the pressure plate and the metering roll mechanisms.

A high turning torque must necessarily be applied to gear 275 in order that said gear may rotate at a sufficient angular velocity to produce desired exposure speeds of curtain 259. To impart such a torque to said gear, a spring drive comprising a drum 291, a spring 292 and a shaft 293 is provided having said shaft pinned or otherwise suitably secured to said gear. Spring 292, as shown in Fig. 15, is wound about shaft 293 and is fixed at one end to drum 291 and at the other end to said shaft and is adapted to drive the latter, thereby driving gear 275. Means, to be described, are provided whereby shaft 293 is held against rotation during the operating cycle while drum 291 rotates relative thereto in a direction to wind spring 292. A torque tending to turn said shaft is thus set up in the spring, the magnitude of the torque depending on the amount of relative rotation between drum 291 and said shaft. When shaft 293 is finally released for rotation, it is driven by said spring and moves curtain 259 to expose the film for a photograph.

Drum 291 is rotated to wind spring 292 by being threadedly secured to a hub 294 of a bevel gear 295, the latter being part of a differential drive. The drive comprises a pair of bevel gears 296 and 297 mounted for rotation on shafts 298 and 299, respectively, said shafts being journalled in a worm gear 300. Worm gear 300 has suitable openings therein for receiving gears 296 and 297, and is freely mounted upon a shaft 301 rotating about an axis that is perpendicular to the axis of shafts 298 and 299. A bevel gear 302, shown integral with shaft 301, meshes with gears 296 and 297 and is adapted to drive gear 295 when gear 300 is fixed against rotation and when shaft 301 is driven by a gear 303 pinned to said shaft. Gear 303 is operatively engaged by a bevel gear 304, shown in Fig. 1, the latter being mounted on a shaft 305, and said shaft is adapted to be driven by a worm and worm wheel drive 306 from shaft 196 (Fig. 10). Accordingly, drum 291 is driven for the same interval that the main film is being metered, and the spring drive is wound by said rotation, being prepared for moving curtain 259.

Novel means operable in conjunction with bellows 215 are provided whereby shaft 293 is held against release while drum 291 winds spring 292 and whereby said shaft and, therefore, shutter curtain 259 are released for movement, with the second cyclic expansion of said bellows. The means comprise a pair of cams or ratchet wheels 307 and 308 of similar peripheral contour, each being provided with a single notch, and both being suitably mounted on shaft 293 so as to be displaced 180° to each other. In the illustrated embodiment, cam 307 is shown integral with shaft 393 and cam 308 is secured to the former by suitable means, such as rivets 309. During the major portion of the cycle of operations, shaft 293 is held against release, i. e., against clockwise rotation as viewed in Fig. 17, by a lever 310 pivotally mounted about a pin 311. An arm 312 of said lever is adapted to engage the notch in cam 308, thereby holding the same against rotation in a clockwise direction. A second arm 313 also formed with said lever bears against the periphery of a cam 314 mounted on shaft 288, and is yieldingly held in contact with said cam by a coil spring 315. Coil spring 315 is fixed at one end to arm 313 and at the other end to a supporting plate 316 in which pivot pin 311 is mounted and which is secured by means such as screws 317 to frame 263. Cam 314, as shown, comprises a circular disc having two symmetric and radially projecting portions 318 and 319 integral therewith and disposed diametrically opposite each other and adapted to pivot lever 310 in a clockwise direction when brought into contact with arm 313. Shaft 288 which actuates the means for reversing the shutter drive rotates a half revolution every cycle of operation and cam 314 is suitably positioned on shaft 288 to have lever 310 pivoted thereby substantially at the end of the cycle.

When lever 310 is pivoted in a clockwise direction, as viewed in Fig. 17, arm 312 moves away from cam 308 and becomes disengaged from the notch therein, thereby permitting rotation of said cam and of shaft 293. At this point in the cycle of operation, the bellows 215 have been collapsed a second time and a pin 320, actuated by said bellows in a manner to be hereinafter described, is in position to engage the notch in cam 307. This limits the rotation of shaft 293 to a displacement that is only sufficient to move the notch in cam 308 past arm 312 and to free shaft 293 from said arm. Shaft 293 is then held against rotation by pin 320 and when said pin is disengaged from the notch in cam 307, shaft 293 is rotated substantially a single revolution and curtain 259 is moved thereby to expose the film. The total rotary movement of shaft 293 during each cycle of operation will not exceed a single revolution, since cam 308 is held by lever 312 at the start of the operation and at the completion of the cycle after an exposure has been taken, i. e., after pin 320 has been disengaged from cam 307, said lever again engages and holds said cam.

In order that the release of shutter curtain 259 be concurrent with the second expansion of the bellows, pin 320 is suitably secured to or formed integrally with a rod 321, said rod being slidably mounted for reciprocal movement in a bracket or bearing member 322 which is a part of supporting member 316. A bushing 323 is fixed in member 322 and a collar 324 is attached to rod 321, so that a compressed coil spring 325 interposed between said bushing and said collar tends to keep pin 320 in engagement with cam 307. A portion of rod 321 extends rearwardly in a horizontal plane substantially at right angles to the axis of the part slidable in bracket 322 and serves as a cam follower, engaging a cam 326 fixed to plate 219 of the bellows structure. Cam 326 has an edge 327 thereof adapted to cooperate with rod 321 in such a manner that when the bellows are in collapsed position, pin 320 is in engagement with cam 307 as shown in full lines in Fig. 17. However, when the bellows are expanded, said cam takes a position, shown by broken lines in Fig. 17, having been moved upward and having caused rod 321 and pin 320 to move to the right and away from cam 307 to clear the notch therein.

Bellows 215, for reasons hereinbefore disclosed, are expanded twice during the operating cycle, and both times pin 320 is moved to the right and away from cam 307. Nevertheless, the first expansion does not release the shutter mechanism as shaft 293 is then held against rotation by arm 312 of lever 310 which is in engagement with the notch in cam 308. However, just prior to the completion of the second collapse of the bellows, cam 314 pivots lever 310 and permits shaft 293 to rotate the limited amount necessary to keep arm 312 disengaged from the notch in cam 308 for a complete revolution so that shaft 293 is then held against rotation only by pin 320. Accordingly, when the bellows are expanded for a second time, shaft 293 is freed for substantially a complete revolution and moves shutter curtain 259 for an exposure. Thus, the shutter mechanism can be actuated to expose the film only after the cycle of operations, metering and positioning the film, is completed.

In order to control the operation of motor 184a, lever 310 has a horizontally extending arm 310a (Fig. 17) adapted to actuate a switch 310b. The latter, which is suitably mounted on cone casting 175, is connected in the circuit of motor 184a and breaks said circuit when said lever is rotated clockwise as by projection 318 or 319 of cam 314. After the motor circuit is thus broken, the inertia of the moving parts continues the rotation of said cam until the projecting portion causing the break moves past arm 313. However, the motor circuit is not closed again by this additional rotation but instead remains open, lever 310 being held in the displaced position by cam 308 until the shutter is released. Accordingly, the motor will not resume operation util a new frame of film must be prepared for exposure.

Means are provided whereby the speed of curtain 259 and therefore the exposure timing may be selectively controlled, said means comprising a knob 328 or other manual control (Figs. 1 and 14) readily accessible from the exterior of casing 176. Knob 328 is operatively connected to a bevel gear 329 through which said knob is adapted to drive a second bevel gear 330 mounted on a shaft 331. A worm 332 affixed to or integral with said shaft meshes with gear 300, thereby completing a drive from knob 328 to drum 291, since rotation of gear 300 is transmitted to said drum through gears 296 and 297 and gear 295. The speed of gear 275 and therefore the speed of curtain 259 depends on the torque applied thereto by spring 292 which in turn is a function of the rotation of drum 291 relative to shaft 293, i. e., of the tension induced in said spring by rotation of drum 291 while shaft 293 is held against rotation. Knob 328 is adapted to vary the effective torque applied to shaft 293 by increasing or decreasing the initial tension in spring 292. Since the driving means, crank 184 or motor 184a, causes drum 291 to rotate a single revolution, and since shaft 293 upon release rotates a single revolution, the initial tension in spring 292 becomes the controlling factor in determining the speed at which curtain 259 is moved. Accordingly, knob 328 may be rotated to produce the desired curtain speed and is provided with a dial 333 suitably geared to respond to rotation of said knob and calibrated to indicate the exposure time when viewed through an opening 334 in the cone casing 176.

Operation

The mounting in the airplane is preferably so designed as to have engagement with the cone portion of the camera, and for loading the camera, the same is removed from the plane, and, if desired, the magazine is detached and taken to a suitable dark room. Cover 25 is removed and the film rolls 30 and 31 are positioned in the magazine for rotation about fixed longitudinal axes on the novel three-point supports provided in chamber 29. The unexposed film 61, which is wound on roll 30, is then threaded from said roll to roll 31, this procedure being simplified due to the fact that pressure plate 63 is held away from magazine 26 by lever 335 and friction roll 90 is carried by the cover. Cover 25 is replaced, whereupon the magazine is ready for mounting on cone 24.

In preparing the film for exposure, pressure plate 63 is raised by means of cam 210, follower 209, rods 208 and 142 and arm 141, said last-named parts being actuated by motor 184a through the mechanism described. Once the film is relieved of the pressure of plate 63, it is metered by drum 64 to expose a new frame, and the rotation of said drum, in order to accurately move the film a predetermined distance, is regulated by the cam mechanism including cam 205 and follower 204, which actuates yoke member 203 and thereby operates jaw clutch 194, 195 through which motor 184a drives said drum. Meanwhile, bellows 215 are being collapsed by motor 184a so that when the film metering is complete and plate 63 begins to be lowered said bellows are collapsed. At this point in the cycle, pawl 228 is tripped by lug 237 and bellows 215 are released and expanded rapidly by springs 218, creating a suction in pressure plate grooves 143. Accordingly, the film is smoothed out in the plane of the pressure plate base just prior to the instant it is to be fixed in position between said pressure plate and flange 123 of the cone, thereby eliminating creases and wrinkles in the film.

Motor 184a continues to operate after the first bellows expansion and winds the shutter spring drive while the shutter is held against release by arm 312 of lever 310, said arm engaging cam 308. When spring 292 is energized and the cycle of operations is substantially complete, cam 314 pivots lever 310 in a clockwise direction, thereby opening motor switch 310b and disengaging arm 312 from cam 308. The motor circuit is thus opened but the shutter mechanism is held against operation by pin 320. At this point in the cycle, the bellows have been completely collapsed a second time and are so held when the motor ceases operation.

When solenoid 254 is energized, pawl 228 is tripped and releases bellows 215 for expansion by spring 218. The expansion of the bellows creates a suction which fixes the main film in the focal plane against pressure plate 63. Expansion of the bellows releases the spring drive of the shutter mechanism by raising cam 326 which latter moves pin 320 away from cam 307. The spring drive now rotates annular gear 275 at a speed which depends on the initial tension introduced in said drive through hand knob 328 and in a direction which depends upon the position of the automatically reversible drive controlled by pin 286 and including sleeve 276, gears 274, sleeve 277, yoke 280 and shaft 282. The reversible drive causes metal curtain 259 to move from the roll 260 or 261, upon which it was last wound, and expose the main film. The exposure timing depends upon the speed at which the spring drive causes the opening in said curtain to move past the lenses and therefore depends on the initial tension in spring 292.

During exposure, cam 308 rotates and permits lever 310 to be pivoted by spring 315 so that when a single revolution of the cam is completed, lever arm 312 again engages and holds said cam against motion. Lever 310 has thus pivoted sufficiently to cause arm 310a to close switch 310b and thereby close the circuit through motor 184a, and initiate another cycle of operations.

There is thus provided a novel shutter mechanism operable in combination with an aerial camera and adapted to have the shutter curtain thereof located between the lenses. Novel control and driving means are provided for said shutter mechanism. Although only a single embodiment of the present invention has been illustrated and described, it will be expressly understood that various changes may be made in the details of construction and arrangement of the parts, as will now occur to those skilled in the art, without departing from the spirit and scope of the invention. Reference will accordingly be had primarily to the appended claims for a definition of the limits of the invention.

What is claimed is:

1. In a shutter mechanism for a camera, a shutter curtain consisting of a single sheet of beryllium copper.

2. In a shutter mechanism, a spring drive under an initial tension, power means for additionally tensioning said drive a predetermined amount, curtain carrying means operatively connected to said drive to be driven thereby, exposure timing means adapted to vary the initial tension of said spring drive to thereby vary the speed of motion imparted by said drive when the latter is released, and means for holding the curtain carrying means against movement during the tensioning of said drive and the operation of said exposure timing means.

3. In apparatus of the class described, a curtain, curtain carrying means, driving means operatively connected to said curtain carrying means, said driving means being adapted when released to move said curtain carrying means, control means for releasing said driving means, actuating means for energizing said driving means, and mechanism operatively associated with said actuating means, said driving means and said control means, said mechanism holding said control means inoperative and preventing movement of said curtain carrying means until said driving means are energized.

4. In apparatus of the class described, a curtain comprising a single sheet of material having an exposure opening of fixed dimensions, a pair of spaced drums, said curtain being secured at each end to one of said drums for movement therewith, and means for actuating said drums and effecting an exposure with each actuation, said means comprising driven members, yielding means operatively connecting said members to said drums, driving means and a reversible drive connecting said members to said driving means.

5. In apparatus of the class described, a curtain comprising a single sheet of material having an exposure opening of fixed dimensions, a pair of spaced drums, said curtain being secured at each end to one of said drums for movement therewith, and means for actuating said drums and effecting an exposure with each actuation, said means comprising driven members concentric with said drums, means operatively connecting said members to said drums, driving means and a reversible drive connecting said members to said driving means.

6. In apparatus of the class described, a shutter element consisting of a single thickness of curtain having an opening therein, a pair of spaced drums, said curtain being attached to each of said drums and adapted to be moved between said drums when the latter are actuated, and means for actuating said drums, said last-named means including an automatically reversible drive whereby the curtain is moved for an exposure each time said drive actuates said drums.

7. In apparatus of the class described, a curtain having an exposure opening of fixed dimensions, a pair of spaced drums to which said curtain is attached, said drums being adapted to move the latter to effect an exposure each time the same are actuated, and means for actuating said drums, said means comprising driven members, yielding means operatively connecting said driven members to said drums, driving means, a reversible drive connecting said members to said driving means, and means for controlling the speed of operation of said driving means.

8. In apparatus of the class described, a curtain, a pair of spaced drums, said curtain being secured to and wound on said drums to extend therebetween, and means for actuating said drums, said means comprising driven members, yielding means operatively connecting said members to said drums, a reversible drive connected to said members, and means for varying the speed of said drive.

9. In a shutter mechanism, curtain means, a pair of spaced members supporting said curtain means, and means drivably connected to said members for alternately actuating said members in opposite directions to effect an exposure with each actuation, said last-named means comprising motor means, a reversible drive connecting said motor means to said members, means for energizing said motor means and actuating said reversible drive, and means operatively connected to said motor means for controlling the speed of operation of said motor means.

10. In a shutter mechanism, the combination with driven members and a shutter operatively connected to said members, of spring motor means, a reversible drive connecting said motor means to said driven members, power means for energizing said motor means and for reversing the direction of said drive each time said motor means is energized, and means for varying the tension in said spring motor means to control the speed at which said shutter is driven.

11. In a shutter mechanism, the combination with driven members and a shutter operatively connected to said members, of motor means, a reversible drive connecting said motor means to said driven members, power means for energizing said motor means and for reversing the direction of said drive each time said motor means is energized, and means associated with said motor means for controlling the speed of operation of the latter.

12. In a shutter mechanism, a spring drive under an initial tension, curtain carrying means, a reversible drive operatively connecting said spring drive to said curtain carrying means, means for additionally tensioning said spring drive a fixed amount and exposure control means adapted to vary the initial tension of said spring drive to vary the speed of motion of the latter when released.

13. In a shutter mechanism, the combination with a curtain shutter having a single exposure aperture of fixed size of power means for actuating said shutter to effect an exposure each time said shutter is moved across the camera exposure opening, said means comprising a reversible spring drive connected to said curtain shutter, and exposure means operatively connected to said drive for varying the tension thereof to control the speed of operation of said drive.

14. In a shutter mechanism, shutter means, driving means including a driving member and a driven member, said driving member being connected to said shutter means, control means for releasing said driving means, actuating means connected to said driven member for energizing said driving means, and mechanism operatively associated with said driving member, said actuating means, and said control means, said mechanism rendering said control means inoperative and holding said driving member stationary while said driving means are being energized.

15. In a shutter mechanism, shutter means, power means, a member drivably connecting said shutter means to said power means, actuating means for energizing said power means, control means for effecting the release of said power means, and mechanism operatively associated with said member, said actuating means and said control means, said mechanism holding said control means inoperative and said member against movement during the energization of said power means.

16. In a shutter mechanism, the combination with a shutter having an exposure aperture of fixed size of means for actuating said shutter to effect an exposure, said means comprising driven members, yielding means operatively connecting said members to said shutter, a reversible spring drive connected to said means, power means for actuating and reversing said drive after each exposure, and means for controlling the speed of said drive.

17. In apparatus of the class described, shutter means, driving means operatively connected to said shutter means, said driving means being adapted when released to move said shutter means, control means for releasing said driving means, actuating means for energizing said driving means, and mechanism operatively associated with said actuating means, said driving means and said control means, said mechanism holding said control means and preventing movement of said shutter means during energization of said driving means.

18. In apparatus of the class described, a shutter element consisting of a curtain having an exposure opening of fixed dimensions, a pair of spaced drums, said curtain being attached to each of said drums and adapted to be moved between said drums when the latter are actuated, and means for actuating said drums, said last-named means including an automatically reversible spring drive whereby the curtain is moved in opposite directions for successive exposures, and means for manually adjusting the tension of said spring drive thereby controlling the speed of operation of said drive.

AMBROSIUS BRIECHLE.
ROY T. HURLEY.
GEORGE E. MERRITT.